March 2, 1965 R. G. PATTERSON 3,171,615
CONTROL APPARATUS
Filed Oct. 6, 1958 3 Sheets-Sheet 1
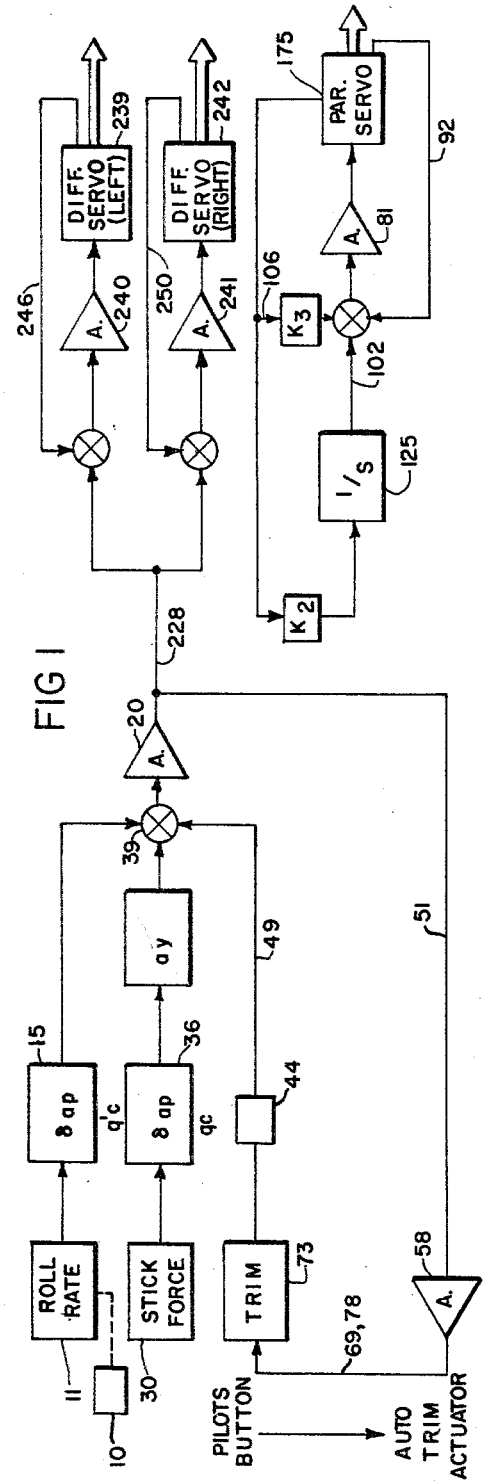
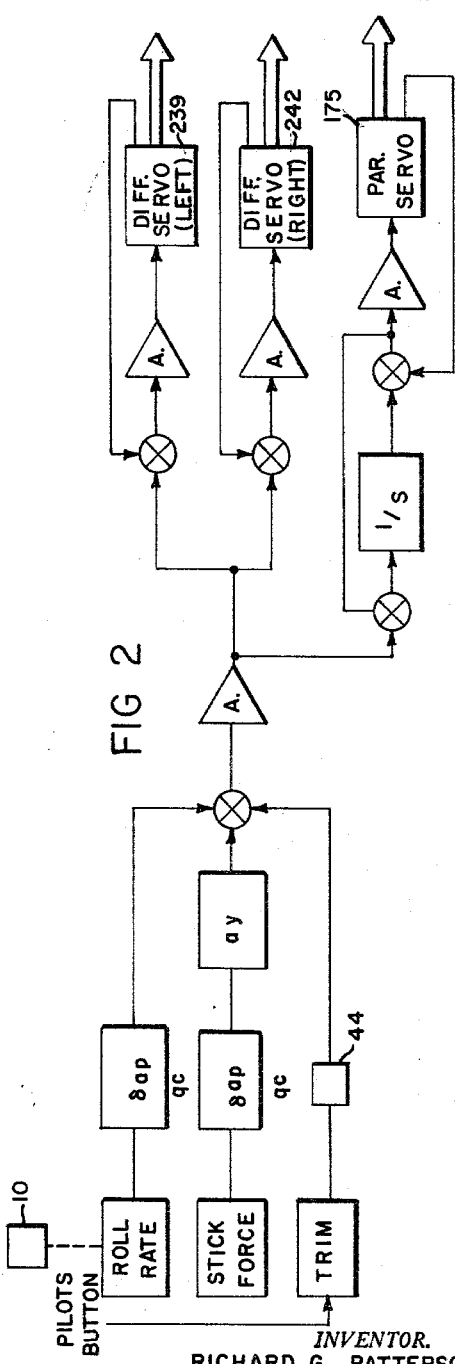
INVENTOR.
RICHARD G. PATTERSON
BY
ATTORNEY

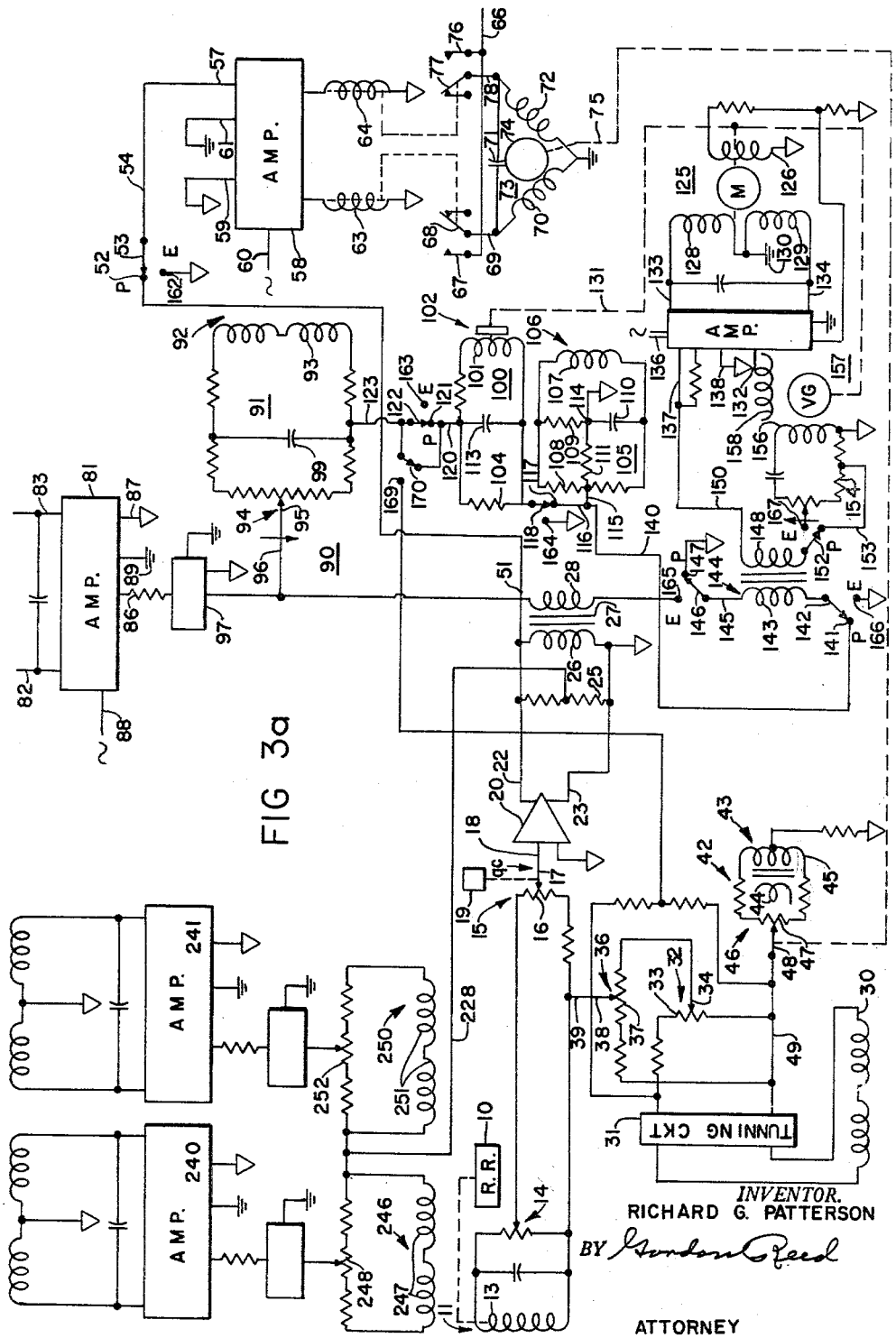

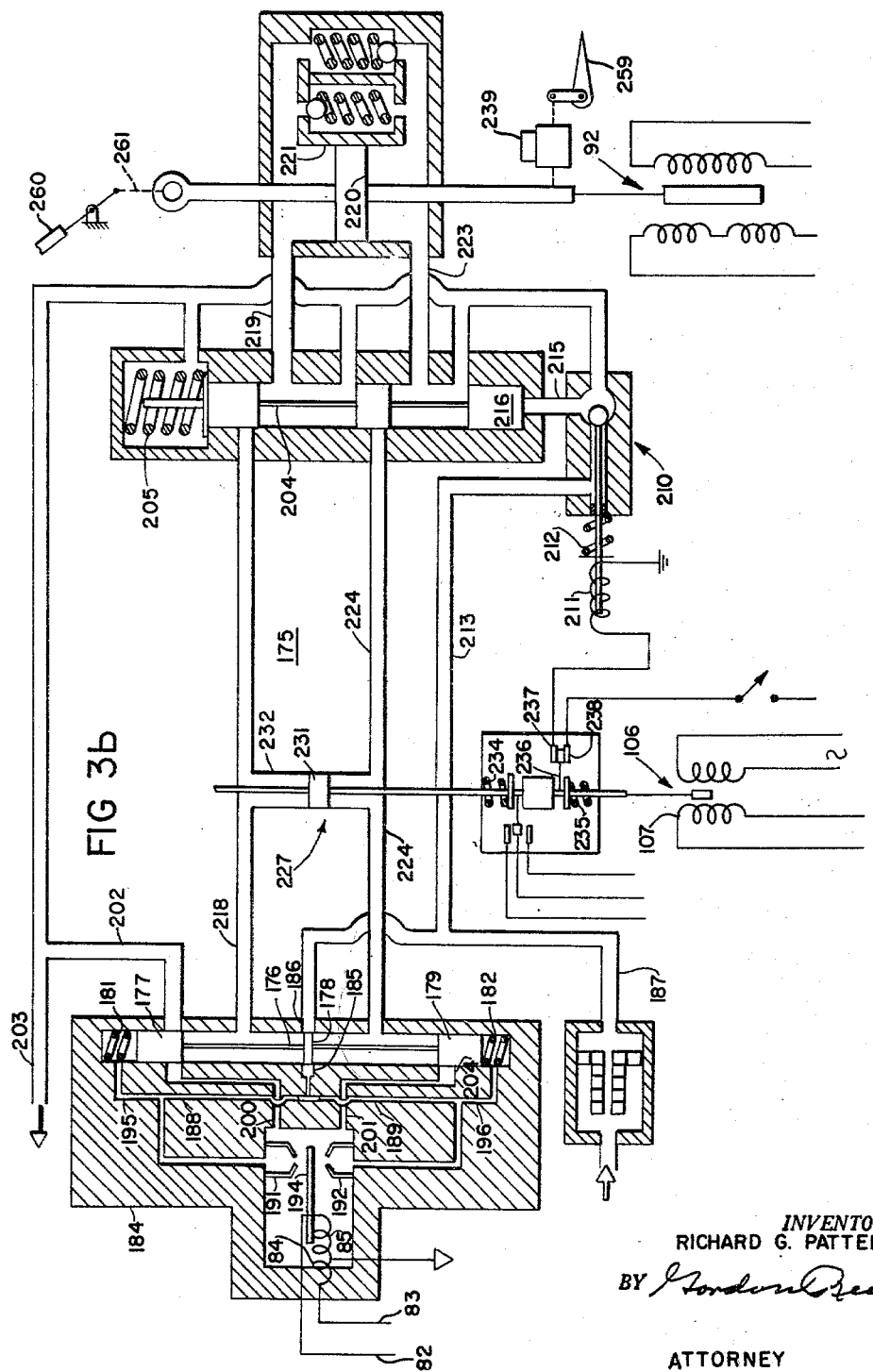

United States Patent Office 3,171,615
Patented Mar. 2, 1965

3,171,615
CONTROL APPARATUS
Richard G. Patterson, St. Louis Park, Minn., assignor to Honeywell Inc., a corporation of Delaware
Filed Oct. 6, 1958, Ser. No. 765,644
14 Claims. (Cl. 244—77)

This invention relates to automatic control apparatus and more particularly relates to automatic flight control apparatus for an aircraft.

Automatic flight control apparatus for an aircraft generally have a preengage mode and an engage mode. In the preengage mode, the control surfaces of the aircraft may be manually operated to place the aircraft in a desired attitude. During this preengage mode, the condition sensing devices of the automatic flight control apparatus may be providing signals in accordance with the change in attitude of the aircraft. Such signals due to change in craft attitude may be automatically balanced to precondition the automatic flight control apparatus to assume control of the attitude of the aircraft at any instant.

The pilot may voluntarily change from the preengage mode to the engage mode and thereafter the automatic flight control apparatus controls the aircraft. The synchronizing or attitude conditioning arrangement for the automatic flight control apparatus is not readjusted during automatic flight control.

In some flight control apparatus similar to that disclosed in the application of Corles M. Perkins, Serial No. 553,131, filed December 14, 1955 during the preengage mode, synchronizing or attitude conditioning of the apparatus is affected through the operation of a pressure trim sensor in the servo of the flight control apparatus while the hydraulic ram of the servomotor remains inoperative. While such mode of synchronizing the automatic flight control apparatus during manual control of the craft control surface is satisfactory to balance electrical signals such as those due to operation of attitude sensors on the aircraft, such mode of synchronizing does not take into account operations of the pressure trim sensor of the servomotor resulting at least in part to imperfections in the servomotor itself.

One object therefore of this invention is to provide a synchronizing arrangement for an automatic pilot that takes into account slight differences in manufacture of elements of the servomotor especially where two such elements may be paired and each has normally an equal but opposite effect on the servomotor operation.

A further object of this invention is to provide a new and improved synchronizing arrangement for an automatic pilot apparatus that takes into account not only signals derived from sensors but also imperferctions in the manufacture of a servomotor of said apparatus.

A further object of this invention is to provide an improved synchronizing arrangement for an automatic pilot for an aircraft that conditions the automatic pilot for subsequent automatic control of the aircraft.

In carrying out the invention in one form thereof an electro-hydraulic type flight control apparatus is utilized. In such apparatus, electrical signals from various sensors responsive to flight conditions of an aircraft through an amplifier control an electrical torquer which operates a control valve of a hydraulic servomotor. During the engage mode at which time a pilot valve is operated to place the servomotor ram in communication with a control valve, operation of a control valve by the torquer effects operation of the hydraulic servo ram. In the preengage mode, the pilot valve is closed but operation of the control valve from the amplifier operated torquer may still be effected.

In the form of the invention herein the electrical signals due to response of various flight condition sensors of the aircraft are synchronized separately from signals from the servomotor itself resulting either by operation of its control valve due to servo construction imperfections or the operation of its ram when overriden by manual control in the preengage mode. In other words the servomotor signals are separately synchronized or balanced. Thus any operation of the servoamplifier while it is isolated from the aircraft flight condition sensors causing energization of the torquer and resulting operation of the control valve and which valve operation might cause immediate operation of the servomotor if the aircraft is in the engaged mode merely will cause a readjustment of the control valve of the servomotor to condition the servomotor for automatic control so that servomotor operation may be introduced without sudden movement of the servo ram on opening the pilot valve to engage the servomotor.

The invention itself both as to its organization and mode of operation together with additional objects and advantages thereof, may be better understood by reference to the following description taken in conjunction with the accompanying drawings in which:

FIGURE 1 is a block diagram of the automatic flight control apparatus in the preengaged mode;

FIGURE 2 is a block diagram of the automatic flight control apparatus in the engaged mode; and FIGURES 3a and 3b together comprise a detailed schematic of the electro-hydraulic flight control apparatus.

The invention has been embodied in flight control apparatus for controlling an aircraft about its roll axis and the apparatus is similar to that disclosed in the prior application of Thomas W. Chase, Serial No. 731,588 filed April 25, 1958, now Patent 2,957,654 but including detailed features of the parallel hydraulic servomotor as more fully disclosed in the aforesaid Perkins application.

In FIGURE 1, as stated the apparatus is shown in the preengaged (P) or synchronizing mode. Various aircraft condition sensing devices are illustrated for example by a roll rate signal generator 11 responsive to roll rate of the craft. This generator may be conventionally operated by a rate gyroscope 10 to develop a signal in accordance with the roll rate which signal is applied through a dynamic pressure responsive gain control device 15 to a summing point 39 or summing differential. An additional control signal is derived from a stick force transducer operated signal generator 30 having its electrical signal modified in accordance with a dynamic pressure responsive gain control device 36 and lateral acceleration gain device *ay* and thereafter the signal is applied to the summing point or differential 39. The output from the differential 39 is applied by transmitting means to a voltage amplifier 20. The output of the amplifier 20 is transmitted by conductor 51 to a switching amplifier 58 which operates a relay that applies A.C. voltage by conductors 69 or 78 to a trim motor 73. The trim motor provides a rebalancing signal through its displacement signal generator 44 which has its output transmitted by conducting means 49 to summing point or differential 39 to rebalance the input of voltage amplifier 20.

The output of the voltage amplifier 20 merely to show identity with the Chase patent is also transmitted by a conducting means 228 in parallel with conductor 51 to a discriminator amplifier 240 for a left aileron differential servomotor 239 and to a discriminator amplifier 241 for a right aileron differential servomotor 242. A servo displacement signal generator 246 is operated by left differential servomotor and its signal is supplied to the input of servoamplifier 240. Similarly a displacement feedback 250 of the right differential servomotor 242 rebalances the input of its amplifier 241.

FIGURE 1 includes a parallel aileron servomotor 175, similar to motor 12, FIGURE 1 of the Chase patent, controlled by an A.C. discriminator amplifier 81 which receives three input signals. The invention is primarily concerned with servomotor 175 and its control means in the pre-engaged mode of FIGURE 1. One signal is a servo position feedback signal from a signal generator 92, a second is a pressure trim displacement signal from a signal generator 106, and a third is a pressure trim time integral signal from a signal generator 102. The servo displacement signal is provided by a signal generator operated in accordance with the displacement of the power end of the servomotor. The pressure trim signal is applied to the input of amplifier 81 through a gain control K3. The pressure trim signal is also supplied through a second gain control K2 to an integrator 125 having its output signal generator 102 supplied to the input of discriminator amplifier 81.

The invention is primarily concerned with the pressure trim feedbacks to the parallel servomotor A.C. discriminator amplifier 81, one feedback being a pressure trim displacement signal through the gain control K3 and the second being the integral of pressure trim displacement through the gain control K2 and the integrator 125. The pressure trim displacement feedback 106 through the gain control K3 affords stability to the synchronizing arrangement of amplifier 81 as will be more fully disclosed.

In FIGURE 2 the apparatus is shown in the engaged mode (E) at which time the apparatus including servos 175, 239, 242 automatically controls the aircraft. In the engaged mode, the trim motor 73 may be conventionally manually controlled to selectively alter the attitude of the aircraft. The output of the voltage amplifier 20 is no longer applied to the switching amplifier 58 but instead is applied not only to the discriminator amplifiers 240, 241 for the left and right aileron differential servomotors 239, 242 but also to the integrator 125 and thence to the parallel servomotor discriminator amplifier 81 which controls the parallel servomotor 175. The integrator 125 is additionally controlled by a feedback arrangement more fully disclosed and claimed in the aforesaid Chase patent to prevent "overrun" of the integrator.

Structural details of the apparatus present in FIGURES 3a and 3b include A.C. type signal generators or electrical pick-offs of the inductive type. Unless otherwise specified, the inductive pick-offs will be of the variable differential transformer type old in the art comprising a primary winding, a secondary winding and an operable core. The primary windings comprise a pair of individual windings oppositely connected so that the magnetic fields through the windings are in opposition. Normally there is no resultant voltage induced in the secondary with the core in normal position. Displacing the core which displacement may be linear or angular depending on the transformer will change the induction between the individual windings of the primary and the secondary winding. For purposes of simplification of the drawing, the adjustable core and the primary winding have been omitted in most instances.

In FIGURE 3a and considering the apparatus in the disengaged mode (P) indicated by the positions of various switches 53, 122, 141, 146 to effect preconditioning, any rate of roll of the craft is sensed by gyroscope 10 which operates a core of a differential transformer 11 having a primary winding not shown to develop in a secondary winding 13 a signal in accordance with the rate of roll of the craft. The output of winding 13 is applied across a manually adjustable gain control potentiometer 14 to provide a desired voltage per degree per second craft roll rate. The output of the gain control potentiometer is applied across a second gain control potentiometer 15 having a resistor 16 and slider 17. The slider 17 is displaced toward the lower end of resistor 16 by ($qc$) sensor 19 for increasing values of dynamic pressure ($qc$). Thus the amount of voltage developed in winding 13 for a given roll rate is decreased in accordance with ($qc$) when applied to the control apparatus. A conductor 18 connects slider 17 with an input terminal of voltage amplifier 20. An opposite control terminal of amplifier 20 is connected to signal ground or null point of the differential transformer.

The amplifier 20 includes output terminals 22, 23 across which are connected a voltage dividing resistor 25 and a primary winding 26 of a transformer 27 having a low impedance secondary winding 28.

Signals in accordance with pilot stick force are derived in a differential transformer secondary winding 30 of a stick force transducer old in the art.

The voltage across winding 30 is applied through a tuning circuit 31 across a resistor 33 of a manually adjustable gain control potentiometer 32 having adjustable slider 34. Connected across slider 34 and the lower end of resistor 33 is a second gain control potentiometer 36 having a voltage dividing resistor 37 and adjustable slider 38. The slider 38 is adjusted in a leftward direction in accordance with dynamic pressure ($qc$) so that for a given voltage in winding 30 the amount of voltage used to control the apparatus decreases with increase in dynamic pressure. A conductor 39 connects slider 38 and the lower end of resistor 16 of potentiometer 15 to algebraically combine the modified stick force signal with the modified roll rate signal.

Synchronizing signals which balance roll rate and stick force signals are obtained from a signal generator 42 comprising a transformer 43 having a primary winding 44 and a secondary winding 45. The generator includes a potentiometer 46 having a resistor 47 connected across the secondary winding 45 and an adjustable slider 48. A conductor 49 connects slider 48 to the lower end of potentiometer resistor 37 to algebraically combine the synchronizing signal with the roll rate and stick force signals. A center tap of secondary winding 45 extends to signal ground.

If the sum of the three signals, roll rate, stick force, and synchronizing are not equal to zero, the amplifier 20 has its output applied to the conductor 22, conductor 51, preengage contact 52, selector switch 53, conductor 54, to an input member 57 of a switching amplifier 58. Amplifier 58 includes a second input member 59 connected to signal ground, an A.C. power input member 60 and a ground conductor 61.

The amplifier 58 is of the A.C. discriminator type and operates one or another of a pair of delay windings 63, 64 depending upon the phase of the input voltage on member 57. The amplifier energized winding 63 connects an A.C. power source conductor 66 through in contact 67, relay arm 68, conductor 69 in multiple conductor conduit to one motor winding 70 and also through phasing capacitor 71 and second motor winding 72 of a motor 73 to signal ground. The motor 73 is of the inductive type and its armature 74 through suitable operating means 75 operates potentiometer slider 48 to rebalance the input to voltage amplifier 20. Also the discriminator amplifier energized relay winding 64 associates power source conductor 66 through relay in contact 76, relay arm 77, conductor 78 in the multiple conductor conduit directly to motor winding 72 and through phasing capacitor 71 to the second operating winding 70 of motor 73 to reversely operate the motor. Thus the network that is responsive to flight condition sensors and that controls the amplifier 20 is maintained in a null condition while the pilot directly manually controls the attitude of the craft as desired, whereby the apparatus is synchronized or preconditioned to the attitude of the aircraft obtained at any instant.

Continuing with the preengaged mode (P), which as shown in FIGURE 1 involves a parallel servomotor, reference will be made to FIGURES 3a and 3b in the following description.

In FIGURE 3a, a parallel servoamplifier 81 which is an A.C. voltage amplifier-demodulator has its output applied alternatively via conductors 82, 83 to transfer valve operating coils 84, 85 of the servomotor 175 of FIGURE 3b. Amplifier 81 includes signal input members 86, 87 and power input connecting members 88, 89.

In the preengaged mode, an amplifier control circuit 90 connected to control members 86, 87 of amplifier 81 comprises a servo balance or servo displacement signal generator 91; a signal generator 100 developing a signal in accordance with the integral of servo pressure trim; and a pressure trim displacement signal generator 105. Signal generator 91 comprises a secondary winding 93 of a differential transformer 92 having its core, as shown in FIGURE 3b, operated in accordance with the parallel servomotor ram displacement. Connected in parallel across winding 93 is the resistor of a voltage dividing potentiometer 94 and a capacitor 99. Potentiometer 94 includes an adjustable slider 95 for varying the output voltage selected for a given voltage in winding 93. Signal generator 100 comprises a secondary winding 101 of a differential transformer 102 having a core which is adjusted relative to the windings in accordance with the displacement of an integration motor to be described. Signal generator 100 comprises a resistor 104 and capacitor 113 connected in parallel across winding 101. Signal generator 105 comprises a secondary winding 107 FIGURE 3b of a differential transformer 106 having a magnetic core positioned relative thereto in accordance with the pressure in opposed conduits in the servomotor 175 FIGURE 3b to be described. Connected in parallel across winding 107 is a center tapped resistor 108 FIGURE 3a on one hand and a resistor 109 and capacitor 110 connected in series. The junction 114 of the capacitor 110 and resistor 109 is connected to signal ground and a resistor 111 extends from terminal 114 to the center tap of resistor 108. Control circuit 90 therefore extends from the signal ground from terminal 114, the center tap resistor 108, conductor 115, conductor 116, preengage contact 117, selector switch 118, resistor 104, conductor 120, preengage contact 121, selector switch 122, conductor 123, potentiometer slider 95, conductor 96, filter 97, and amplifier input member 86. Return to signal ground is through the amplifier member 87.

The differential variable transformer 102 of signal generator 100 is operated in accordance with the integral of the pressure trim signal by a motor 125 through suitable operating means 131. The motor 125 may be a capacitor type induction motor conventionally having a line winding 126 connected to an A.C. supply and having amplifier energized windings 128, 129 which are alternatively energized. The windings 128, 129 are connected to ground 130 and at their opposite ends are connected to output conductors 133, 134 extending from discriminator amplifier 132. The motor 125 operates at a rate dependent upon the magnitude of the A.C. control signal on amplifier 132. Thus the time integral of the pressure trim signal may be obtained by applying such signal to the amplifier 132 whereby the displacement from an initial position of output member 131 is a mechanical integration of the pressure trim signal.

Amplifier 132 comprises a power input terminal 136 and signal input members 137, 138. The pressure trim signal from signal generator 105 is supplied by conductor 140, preengage contact 141, selector switch 142, a high impedance primary winding 143 of transformer 144, conductor 145, selector switch 146, switch contact 147 to signal ground. Coacting with primary winding 143 of transformer 144 is a secondary winding 148 having one end connected by conductor 150 to input member 137 and having its opposite end connected by selector switch 152, contact 153, to an intermediate point of a voltage dividing resistor 154 which is connected across a secondary winding 156 of the velocity signal generator 157 through a portion of the voltage dividing resistor arrangement 154 to signal ground. Conventionally the velocity signal generator 157 includes a primary winding 158 connected to the A.C. supply.

The voltage in velocity signal generator secondary winding 156 is applied in opposition to the voltage in secondary winding 148 derived from the signal generator 105 to thereby maintain the rotational velocity of motor 125 proportional to the pressure trim signal.

In the engaged mode (E), in the control circuit for switching amplifier 58, selector 53 engages its engage contact 162 which is connected to signal ground isolating the switching amplifier 58 from the voltage amplifier 20.

In the control circuit 90 for servoamplifier 81 selector switch 122 contacts its engage contact 163; selector switch 118 engages its engage contact 164 which is connected to signal ground; selector switch 146 contacts its engage contact 165 which is connected to one end of transformer secondary winding 28; selector switch 142 contacts engage contact 166 connected to signal ground; selector switch 152 contacts its engage contact 167 operatively connected to resistor 154 whereby a greater portion of the output from the velocity signal generator 157 is utilized in the control circuit of amplifier 132 than in the preengage mode.

With manually selective switch 122 engaging contact 163, a shunting circuit for switch 122 is provided by selector 170 and its associated contact 169 during a gear up configuration more specifically involved in the Chase patent, to maintain the continuity of amplifier control circuit 90.

The parallel servomotor 175 with which the servo balance signal generator 91 and pressure trim signal generator 105 are operatively related is shown in FIGURE 3b. The servomotor 175 of FIGURE 3b is of the hydraulic linear displacement type and comprises a control valve 176; an engage valve 204; a ram 220; a pilot valve 210; and a pressure trim sensor 227. The control valve 176 is of the spool type and comprises three axially spaced lands 177, 178, and 179. The lands 177 and 179 comprising the ends of the valve spool have their ends engaged respectively by centering springs 181, 182 within suitable chambers in valve casing 184. The center land 178 coacts with an annular channel 185 in valve chamber 184. The annulus communicates through a passage 186 in member 184 to an external source of supply pressure by a conduit 187. Extending from annulus 185 are passages 188, 189 which supply fluid respectively to opposed nozzles 191, 192. Coacting with the nozzles is an actuable flapper or obturating member 194. The actuable valve flapper and nozzles comprise a transfer valve. The flapper is positioned by the transfer valve coils 84, 85 alternatively which are energized from the parallel servoamplifier 81 FIGURE 3a. For one phase of A.C. control signal, the flapper member 194 is moved toward one nozzle and for the opposite phase A.C. signal the flapper is moved toward the other nozzle thereby restricting the flow through the nozzle toward which the flapper is moved. This restriction of flow causes a pressure build up in passages 188 or 189. Extending from these passages are sub passages 195, 196 which communicate with the opposite ends of the lands 177, 179 to position the spool valve 176 in response to the pressure rise or build up. Coacting with the nozzles 192 and 193 are exhaust passages 200, 201. Passage 200 communicates through an annulus about land 177 to an external return conduit 202 and thence to a main exhaust conduit 203. Passage 201 communicates with a port in member 184 coacting with land 179.

The engage valve 204 is also of the spool type having three lands. It is operated in one direction by hydraulic pressure and in the reverse direction by a return spring 205. The position of the engage valve 204 is controlled by a pilot valve 210 which is positioned rightwardly in the FIGURE 3b upon energization of its operating solenoid 211 during which time a return spring 212 is compressed between a collar on the valve rod and motor frame. Upon deenergization of winding 211, the spring 212 moves the pilot valve to the leftward position shown. In the rightward position of valve 210, fluid pressure from conduit 187 and a communicating separate conduit 213 passes through the pilot valve 210 and a further conduit 215 to engage one end 216 of the engage valve 204 thereby moving it to an upper position.

In this upper position of the engage valve 204 and upon upward movement of the flapper member 194 toward nozzle 191 increasing the pressure in passage 195 causing downward movement of the control valve 176, fluid pressure from pressure conduit 187 passes through the control valve 176 and an upper conduit 218, through the engage valve 204 and sub conduit 219 so the upper side of a ram 220 operable within a cylinder 221. The exhaust fluid from the ram and cylinder passes through conduit 223, engage valve 204, conduit 224, exhaust passages 201, 200 sub conduit 202 to main exhaust conduit 203. The assembly comprising valve 176 and flapper 194 is well known in the art as a Model 971 Moog valve, therefore is not new herein.

Operation of the ram 220 positions the operating means for the two aileron surfaces as more fully disclosed in the aforesaid Chase patent and also operates the differential transformer 92 to rebalance the input control circuit 90 to the servo amplifier 81.

It will be evident that when the flapper member moves toward the lower nozzle 192, that the control valve 176 is moved upwardly resulting ultimately in applying pressure to the lower side of ram 220 and effecting opposite displacement thereof. At this time the ram cylinder 221 exhaust through passage 219, engage valve 204, conduit 218, control valve 176, conduit 202 to main exhaust conduit 203.

The pressure trim sensor 227 comprises a piston 231 operable within a passage 232. Ram or piston 231 coacts with centering springs 234, 235 which serve to return the ram 231 to its longitudinal center position in passage 232. The displacement of the ram 231 operates the core of differential transformer 106 to supply the pressure trim signal. The operation of ram 231 is also utilized to displace a contactor 236 coacting with two switch members 237, 238. The switch members and contact are a constant integral part of a circuit for energizing winding 211 of the pilot valve 210.

Coming now to the features more intimately concerned with the invention, the pressure trim sensor ram 231 operates in response to differential pressures in conduits 218 and 224 communicating with passage 232. Such differential pressure may be due to displacement of the flapper member 194 in response to energization of the transfer coils 84, 85 but such differential pressure may also be due to the relative physical dissimilarity in nozzles 191 or 192. Such differential pressure also may be due to the physical dissimilarity between members of a pair of other elements of the control valve and its chamber. The members of such pair exert an opposing effect on the positioning of ram 231 and their dissimilarity may cause unwanted displacement of piston 231.

Reverting to the arrangement of FIGURE 3a, and as shown in block form in FIGURE 2, the apparatus includes a left and a right differential or series servomotor which coact with the parallel servomotor 175 in an arrangement more fully disclosed in the aforesaid Chase patent. The differential servomotors are unlike the parallel servomotor 175 in that while the ram of each differential servo operates an aileron in response to control signals such ram is automatically centered and locked upon removal of hydraulic supply pressure to the differential servo. Such locking permitting each differential servomotor to act as a mechanical link thereby permitting operation of the valve for the main jack actuator as disclosed in the aforesaid Chase patent by operation either of the conventional control column of the aircraft or parallel servomotor. Patent 2,819,031 to Christensen illustrates such differential servomotor, identified therein by character 12. The left aileron differential servomotor herein is controlled from an amplifier demodulator 240 whereas the right aileron differential servomotor 242 is controlled from an amplifier demodulator 241. Amplifier demodulators 240, 241 receive control signals via conductor 228 from the voltage dividing resistor 25 across the output conductors 22, 23 of voltage amplifier 20. Amplifier-demodulator 240 has its input circuit rebalanced by the operation of a differential transformer 246 having its secondary winding 247 through a voltage dividing resistor 248 connected in series with the voltage from conductor 228. Similarly, the input circuit of amplifier-demodulator 241 is balanced by the operation of a differential transformer 250 having its secondary winding 251 connected through a voltage dividing resistor 252 in opposition to the voltage on conductor 228. The differential transformers 246 and 250 provide rebalance signals and are operated respectively by the left and right differential or series servomotors 239, 242.

Reverting to FIGURES 2, 3a and 3b, regarding a novel feature herein when the auto-pilot is in the disengaged mode (P) any differential pressure in conduits 218, 224 acting upon the trim pressure sensor ram 231 will result in operation of the differential transformer 106 to develop a voltage in signal generator 105 which energizes transformer primary 143 and secondary 148 which results in the application of a control voltage to amplifier 132 and consequent energization of the integration motor 125. The motor 125 through operating means 131 operates the differential transformer 102 as long as the circuit on amplifier 132 is unbalanced developing a signal in generator 100 that is applied to the control circuit 90 of the main servoamplifier 81. Energization of amplifier 81 results in the energization of one or the other of the transfer valve coils 84, 85 which serves to modify the position of the parallel servomotor flapper member 194. Repositioning of the flapper will equalize the fluid pressure on opposite sides of ram 231 thereby permitting the centering springs 234 and 235 to return the ram 231 to its center position. At this position the differential transformer 106 is also centered thereby nulling the same and removing the signal from generator 105 and balancing the input circuit of amplifier 132. The integrator motor 125 retains its displaced position and its operation is terminated but it serves to maintain equal pressures on opposite sides of ram 231 through control of flapper 194 by amplifier 81.

When the autopilot apparatus is placed in the engaged mode (E), the integration motor 125 will not be energized from the pressure trim sensor transformer 106 since switch arm 141 now engages contact 166 but the motor 125 remains as displaced thereby retaining the pressure trim integration signal in generator 100.

In the preengaged mode (P) in which mode the pilot may directly manually operate the control surface 259 through control stick 260, link 261, ram 220 without significant opposition from the parallel servomotor 175, operation of motor 125 is also required since a signal is developed by the operation of the servo balance differential transformer 92. This signal also unbalances the control circuit for amplifier 81 resulting in the energization of the transfer valve coils 84, 85 that in turn results in a differential pressure in conduits 195 or 196. This differential pressure causes displacement of valve 176 and in turn pressure displaces the ram 231 of pressure trim sensor 227. A signal is thus developed by the pressure trim sensor differential transformer 106. This signal due to operation of transformer 106 operates the integration motor 125 which rebalances the input to the servoamplifier 81 and again permitting the recentering of the pressure trim sensor. This equalizes the pressure in trim sensor 227 and thus avoids differential pressure on ram 220 when the latter is subsequently engaged.

In order to reduce the time required for this equalization of pressure on ram 231 thereby to reduce the time prior to which the pilot of the craft may engage the parallel servomotor without a "bump," it is desirable to have a fast acting integrator motor 125 that quickly supplies through motor operated differential transformer 102 a signal which balances the above signal from the servo balance differential transformer 92. However, if the integrator speed is too rapid, an over shoot of the integrator motor 125 results and the servomotor trim sensor 231 will oscillate.

To avoid such oscillation of ram 231 and yet obtain a desirable fast acting integrator motor 125, a proportional plus integral control for circuit 90 of amplifier 81 is supplied wherein the proportional signal is supplied from the pressure trim sensor differential transformer 106 directly onto the control circuit 90 of amplifier 81 and the integral control through signal generator 100. The proportional trim signal tends to prevent increase in said signal whereas the integral signal tends to center the ram 231 to remove a steady state trim signal.

It will now be apparent that a novel synchronizing and pressure trim compensating arrangement in control apparatus for a hydraulic servomotor has been provided which during a preengaged mode synchronizes the servomotor control to the existing displacement of its associated aircraft control surface and which also compensates for imperfections in construction in the servomotor which would if not corrected cause a permanent pressure differential that would be immediately applied to the servomotor upon a change from the preengaged mode to the engaged mode.

It will be further evident that in conjunction with the novel synchronizing and trim compensating arrangements for the servomotor that there has also been provided a synchronizing arrangement which synchronizes the aircraft condition sensing devices to the condition of the aircraft prior to the introduction of the engaged mode.

What is claimed is:

1. In control apparatus for an aircraft having a control surface positionable to change craft attitude, in combination: a parallel servomotor for positioning said surface; manually operable means for positioning said surface but also displaced by operation of said servomotor; a signal generator positioned with said surface and providing a first signal; means rendering said servomotor ineffective, thereby permitting manual operation of said surface and operation of said first signal generator the operation of the surface serving for example to compensate for changes in trim of the craft to maintain a desired flight attitude; further means providing a second signal; control means for said servomotor having an input receiving said first signal and an output controlling the further means thereby developing a second electrical signal while said servomotor is ineffective; an integrator connected to be responsive to said second signal and developing a third signal which is a time integral of said second signal; and means applying said third signal to the input of said control means in opposition to said first signal to restore said control means to an unoperated position thereby removing said second signal, for preconditioning said control means for the institution of servomotor control of said surface.

2. A fluid operated servomotor having a power ram and a cylinder which are relatively displaceable and ram control means having two fluid passages normally passing equal quantities of fluid per unit time; positionable means restricting flow through one passage to effect relative displacement of said power ram and cylinder; a second ram and cylinder in said servomotor operated by the ram control means; means isolating the power ram and cylinder from the ram control means thus rendering said first power ram ineffective for displacement relative to its cylinder by said fluid while permitting relative displacement of said second ram and cylinder during unequal passages of fluid through said two passages; signal generating means responsive to relative displacement of said second ram and cylinder and developing a first electrical voltage; an integrator connected to be responsive to said first voltage and developing a second voltage which is a time integral of said first signal voltage; and second control means connected to said integrator and responsive to said second voltage to reposition said positionable means for equal flow through both passages to remove the relative displacement of the second ram and cylinder for preconditioning said servomotor for automatic control of said power ram and cylinder.

3. The apparatus of claim 2; a balanceable voltage network; means responsive to a craft flight condition unbalancing said notwork; synchronizing means connected to be responsive to said network and in turn rebalancing said network; means rendering said synchronizing means ineffective to further alter balance on said network; and further means rendering said first signal voltage means ineffective on said integrator and thereafter controlling said integrator from said balanceable voltage network.

4. Apparatus for controlling a hydraulic servomotor comprising in combination: a chamber; a pair of fluid pressure inlet ports therein, said ports facing one another; a fluid pressure outlet port from said chamber; a movable obturating member located between said ports and movable to and fro between them; an armature operating said obturating member; said obturating member being biased to mid position between said ports; electromagnetic means operating said armature; a first control valve biased to unoperated position and displaced therefrom upon difference in fluid volume passing through said ports in response to adjustment of said obturating member; a first piston responsive to movement of said control valve; a signal generator operated in proportion to displacement of said piston; means for energizing said electromagnetic means from said generator to terminate operation of said armature, said obturating member returning to mid position, to thereby return said control valve to unoperated position; biasing means returning said piston to unoperated position upon return of said control valve; a hydraulic servomotor second piston; means for placing said second piston in communication with said control valve to be responsive thereto; switch means disconnecting said signal generator and electromagnetic means; and means for additionally energizing said electromagnetic means in response to a change in a condition, all whereby said operation of said first piston conditions said electromagnetic means for subsequent automatic condition control.

5. The apparatus of claim 1, and feed-back means for also directly supplying said second electrical signal to the input of said control means.

6. The apparatus of claim 2, and means for additionally controlling said control means from said first electrical voltage.

7. In a fluid operated servomotor having a power ram and cylinder relatively displaceable said servomotor including control means for positioning said ram, said control means having two ffuid passages normally passing equal quantities of fluid per unit time; positionable means biased to a mid position but displaceable therefrom to restrict flow through one passage to effect relative displacement of said power ram and cylinder; trim means connected to said control means operated from a normal position by unequal flow in said fluid passages; means rendering said power ram ineffective for displacement relative to its cylinder by said fluid; means operating said trim means during unequal passages of fluid through said two passages; signal generating means connected to be responsive to operation of said trim means and developing a first electrical voltage; an integrator connected to the signal generating means responsive to said first voltage and developing a second voltage which is a time integral of said first voltage; and second control means responsive to said second voltage serving to reposition said positionable means for equalizing the flow through both passages permitting restoration of said trim means to unoperative position for preconditioning said servomotor for automatic control of said power ram and cylinder.

8. In a servomotor having an output member relatively displaceable with respect to a fixed member: a positionable control member movable relative to two opposed members connected to said servomotor for reversible control of said servomotor following a selected time; further means connected to said opposed members responsive prior to said time to relative displacement of said positionable member and said two opposed members and developing a first voltage; an amplifier connected to the further means and responsive to said first voltage; a motor controlled by said amplifier and developing a second voltage which is a time interval of said first voltage; and control means connected to be responsive to said second voltage to reposition said positionable means relative to said two opposed members, for preconditioning said positionable control member for subsequent control of said servomotor for automatic control at said selected time.

9. In a fluid operated servo means comprising: a control valve; a fluid type motor including ram and cylinder members connected for operation in response to movement of said control valve; means for preconditioning said control valve for servo means control while isolating the fluid motor from the control valve comprising: a spring restrained fluid pressure operated trim means operated by flow of fluid responsive to displacement of said control valve; a signal generator responsive to operation of said trim means; an amplifier controlled by said signal generator; a motor controlled by said amplifier and providing a second signal which is a time integral of said trim signal; and means controlling said control valve from said second signal to effect opposite displacement of said valve.

10. In an electrically controlled fluid operated servo having a ram and cylinder: a control valve; a fluid supply controlling pilot valve; a control circuit for operating said pilot valve including solenoid means connected to said pilot valve for effecting movement thereof; a trim motor connected for operation by fluid in response to movement of said control valve; a first signal generator responsive to said trim motor operation; a motor operated integrator responsive to said first signal and developing a second signal which is a time integral of said first signal; and means including said control circuits responsive to said second signal and controlling movement of said control valve; further means connected to be responsive to operation of said trim motor and opening the circuit of said pilot valve during response of said integrator motor to said first signal to close the pilot valve.

11. A fluid passage servomotor having an output member relatively displaceable with respect to a fixed member; a fluid passage control valve means comprising a positionable member movable relative to two opposed members to port fluid in alternative directions to said output member to reversibly control said servomotor; further means connected to be moved by fluid from an unoperated position in response to relative displacement of said positionable member and said two opposed members and developing a first voltage; an amplifier connected to said further means and responsive to said first voltage; a motor controlled by said amplifier and operating at a rate dependent on said first voltage and developing a second voltage which is a time integral of said first voltage; and control means responsive to said second voltage and connected to said control valve means to reposition said positionable means to permit return of said further means to unoperated position; and means effective on return of said further means to unoperative position to place said control valve means in communication with said output and fixed members.

12. In a control apparatus for an aircraft having a movable control surface arranged to turn said craft about one axis thereof, a series hydraulic servo means for moving said control surface; a parallel hydraulic servo means for moving said surface independently of said series servo; a first signal source generating a signal proportional to the rate of change of attitude of said craft about said axis; means for controlling both series and parallel servomotors from said first signal; synchronizing means connected to be responsive to said first signal for balancing said first signal during a pre-engaged mode; a positionable member movable relative to two opposed members to reversibly control a ram and cylinder of said parallel servo motor; further means responsive to relative displacement of said positionable member and said two opposed members and developing a first voltage; an integrator connected to the further means and responsive to said first voltage and developing a second voltage which is a time integral of said first voltage; and control means connected to the integrator and responsive to said second voltage to reposition said positionable means while said parallel servomotor is nonresponsive to the positionable member, said integrator being responsive to said first voltage during response of said synchronizing means to said first signal.

13. In a fluid operated servomotor, in combination: means comprising a displaceable, fluid control valve displaceable from a normal position; a displaceable power ram; a second displaceable ram, both rams being displaced in response to displacement of the control valve from a normal position; means isolating the power ram from the control valve while effecting operation of the second ram from the control valve; additional means operated by the second ram providing a signal; a further means responsive to the additional means providing a time integration of said further means signal; operating means for displacing the control valve; and means supplying the time integral signal to said valve operating means to return the valve to the normal position.

14. In a fluid operated servomotor, in combination: a flow control valve; a displaceable power ram; a displaceable second ram, said control valve applying a differential pressure to opposed sides of the power ram and the second ram; means isolating the power ram from the control valve for effecting operation of the second ram from the control valve; additional means operated by the second ram providing a signal; a further means responsive to the signal from the additional means and providing a time integration of said signal; operating means for displacing the control valve; and means supplying the time integral signal and said additional means signal to said valve operating means to equalize the pressures on the opposed sides of said second ram.

References Cited by the Examiner
UNITED STATES PATENTS

| | | | |
|---|---|---|---|
| 2,045,579 | 6/36 | Carlson | 244—78 |
| 2,317,383 | 4/43 | Hull | 121—41 |
| 2,448,564 | 9/48 | Wilkerson | 244—77 |
| 2,632,142 | 5/53 | Chenery | 244—77 |
| 2,674,423 | 4/54 | Noxon | 244—77 |
| 2,740,082 | 5/56 | Ridgefield | 318—489 |
| 2,801,618 | 8/57 | Place et al. | 244—78 X |
| 2,819,031 | 1/58 | Christensen | 244—78 |
| 2,827,605 | 3/58 | Alderson | 244—77 X |
| 2,884,582 | 4/59 | Noxon | 244—77 X |

FERGUS S. MIDDLETON, *Primary Examiner.*

FRANK B. SHERRY, MILTON BUCHLER,
*Examiners.*